Oct. 27, 1942.          B. F. SWEZEY          2,300,321
ADJUSTABLE FISH HOLDER
Filed Sept. 5, 1940
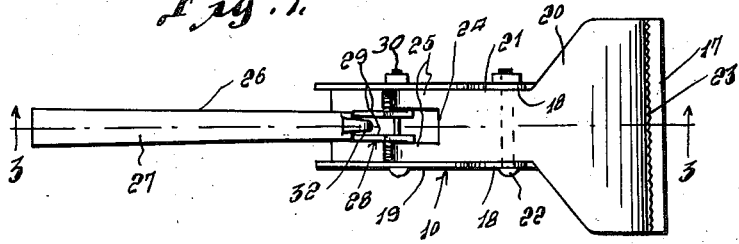
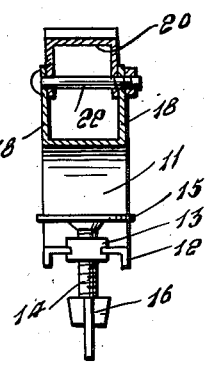
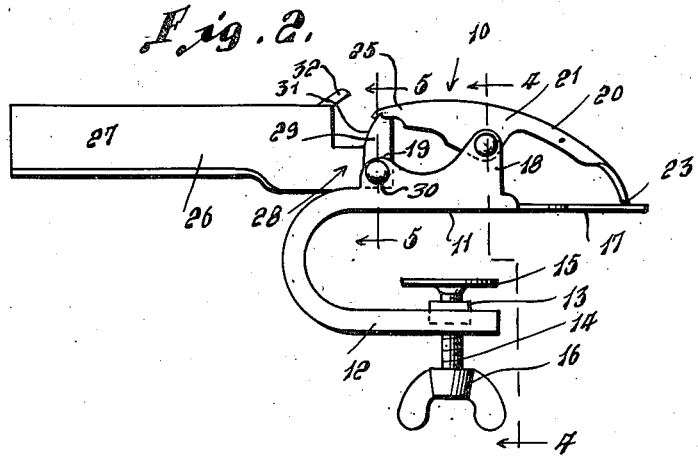
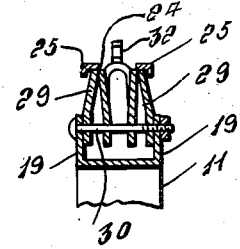
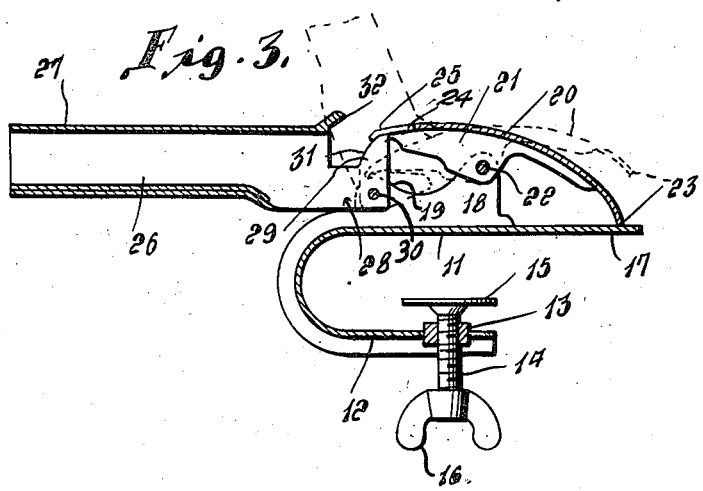
Inventor
Benjamin F. Swezey
By L. F. Randolph
Attorney Patented Oct. 27, 1942

2,300,321

UNITED STATES PATENT OFFICE 2,300,321

ADJUSTABLE FISH HOLDER

Benjamin F. Swezey, Bellingham, Minn.

Application September 5, 1940, Serial No. 355,534

1 Claim. (Cl. 17—8)

This invention relates to an improved construction of holder for use in engaging and holding a fish while being cleaned including means for detachably securing the holder to a supporting surface.

More particularly, it is an aim of this invention to provide a construction of holder including a pair of clamping jaws for engaging a fish having actuating means for readily opening and closing the jaws and for effectively clamping the jaws in a closed position.

More particularly, it is an aim of the invention to provide an improved construction of lever or handle for actuating one of the jaws including a cam portion for engaging beneath the jaw when the handle is swung downwardly for closing the jaw and effectively retaining it in a closed position, and a lug for engaging above said jaw, when the handle is swung upwardly, to retract the cam portion, for moving the jaw to an open position.

Other objects and advantages of the invention will hereinafter become more fully apparent from the following description of the drawing which illustrates a preferred embodiment thereof, and wherein:

Figure 1 is a top plan view of the adjustable fish holder,

Figure 2 is a side elevational view of the same,

Figure 3 is a longitudinal vertical sectional view taken substantially along the plane of the line 3—3 of Figure 1, and Figures 4 and 5 are transverse vertical sectional views taken substantially along the planes of the lines 4—4 and 5—5, respectively, of Figure 2.

Referring more particularly to the drawing, wherein like reference characters designate like or corresponding parts throughout the different views, 10 designates generally the fish holder which includes a base portion 11 which is channel shaped throughout a greater portion of its length. The end of the channel shaped portion is turned downwardly and back upon itself to form the portion 12 which, as best seen in Figure 3, is provided with a threaded insert 13, adjacent its free end, to receive the threaded shank of a follower screw 14 which is provided with a swivelly mounted head 15, at its upper end, and a wing head 16, at its lower end. Base 11 is also provided with a flat extension 17 at its opposite end forming a fixed jaw. The sides of the channeled portion of the base 11, at its end adjacent the jaw 17, are enlarged to provide pairs of upwardly projecting spaced ears 18 and 19.

A movable jaw 20, which is bowed longitudinally, is provided intermediate of its ends with depending sides 21 forming spaced ears which are apertured to aline with apertures in the pair of ears 18 to receive a bolt 22, which is provided with a head at one end and a nut at its opposite end, to thereby pivotally mount the movable jaw 20 relatively to the base 11 and the fixed jaw 17. As best seen in Figure 1, the ears 21 are disposed between the ears 18 and forwardly thereof the jaw 20 is widened to substantially the same width as the jaw 17, which is likewise substantially wider than the channeled portion of the base 11. The forward end of the movable jaw 20 is toothed, as indicated at 23 in Figure 1, which portion is adapted to engage the upper surface of the rigid jaw 17, adjacent its free edge, when the jaws are in a closed position to afford an effective gripping surface for engaging the tail of a fish, not shown, to be cleaned. The opposite, restricted end of the jaw 20, which is disposed rearwardly of the pivot 22, is bifurcated to form a centrally disposed slot 24 and a pair of legs 25, the free ends of which are bent downwardly, as best seen in Figure 2.

As seen in Figure 2, the pair of ears 18 extend to a height substantially above the height of the ears 19. A lever or handle 26, preferably including a tubular gripping portion 27, has the bifurcated extension 28, integral with one end of the gripping portion 27 and which projects from the lower portion thereof. As best seen in Figure 5, the legs 29 of the bifurcated portion 28 are turned outwardly and back upon themselves and are provided, adjacent their lower edges, with alined apertures adapted to aline with corresponding apertures in the ears 19 to receive a bolt 30, which is provided with a head at one end and with a nut at the opposite end. The free ends of the legs 29, as seen in Figures 2 and 3, are elongated to project upwardly to engage under the legs 25 of the jaw 20. These elongated portions of the legs 29 are provided with rounded rear edges forming cam surfaces 31, for a purpose which will hereinafter be apparent. The handle 26 is also provided with a lug 32 which extends upwardly and outwardly from the forward end of the grip portion 27 and which is disposed above and between the legs 29, as best seen in Figure 1.

From the foregoing it will be obvious, that the holder 10 may be readily secured to any suitable supporting surface, not shown, such as a bench, table or the like by moving the base portion 11 so that an edge of the support is engaged between the swivel head 15 of the clamping screw 14 and the portion of the base 11 thereabove, after which the wing head 16 may be manually turned to clamp the support therein. Assuming that the parts of the holder 10 are in the position shown in Figures 1, 2 and 3, the operator then grasps the grip portion 27 of the handle or lever 26 and swings it upwardly on the pivot formed by the bolt 30. This movement causes the legs 29 to swing forwardly and downwardly and out of engagement with the legs 25 of the movable jaw 20 and also causes the lug 32 to be swung forwardly and downwardly to engage the upper side of the movable jaw 20 between the slot 24 and the pivot 22, as seen in dotted lines in Figure 3, to swing the rear end of the jaw 20 downwardly to thereby raise the forward end of the jaw from its position, as seen in full lines in Figure 3 in engagement with the rigid jaw 17, to its position as seen in dotted lines in Figure 3. The slot 24 is provided to accommodate the forward end of the handle 26 when it is swung upwardly to enable the lug 32 to contact and swing the rear end of the jaw 20 downwardly. After the jaw 20 has been moved to the position, as seen in Figure 3, in dotted lines, a fish, not shown, may be positioned so that its tail is resting on the rigid jaw 17. The grip portion 27 of handle 26 is then swung downwardly and back to its original position, causing the legs 29 to swing upwardly and rearwardly so that their cam surfaces 31 will engage under the legs 25 of the jaw 20 to swing the rear end of the jaw upwardly and the forward end downwardly and into clamping engagement with the tail of the fish, to thereby effectively hold the fish so that it can be cleaned.

Various modifications and changes in the construction and arrangement of the parts forming the invention are contemplated and may obviously be resorted to as only a preferred embodiment thereof has illustrated and described.

I claim:

A fish holder comprising a fixed jaw having laterally spaced upstanding ears, a movable jaw having depending ears, intermediate of its ends, pivotally connected to the upstanding ears, said fixed jaw having a second pair of upstanding ears behind its first mentioned pair of ears, a handle pivotally connected to the last mentioned pair of ears, said handle having upwardly projecting cam portions at its forward end for engaging under the rear end of the pivoted jaw and arranged to move the forward end of the pivoted jaw downwardly and into engagement with the fixed jaw, when the handle member is swung downwardly, said handle having an upwardly opening notch adjacent its forward end, the pivoted jaw being provided with a slot in its rear end to receive the notched portion of the handle when the handle is swung upwardly, and a lug carried by the handle for engaging the upper side of the rear end of the pivoted jaw for moving said jaw to an open position when the handle is swung upwardly.

BENJAMIN F. SWEZEY.